Figure 1:
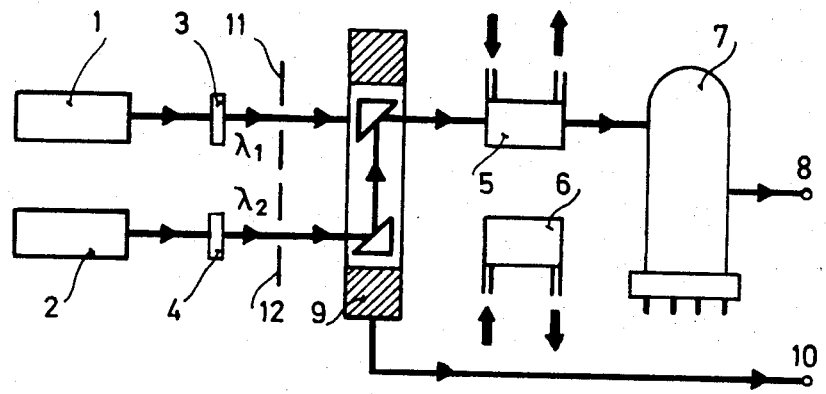

United States Patent
Person

[11] 3,843,226
[45] Oct. 22, 1974

[54] APPARATUS FOR PERIODICAL PARALLEL DISPLACEMENT OF AT LEAST ONE PARALLEL BEAM

[75] Inventor: Tage Person, Kungsangen, Sweden

[73] Assignee: LKB-Produkter AB, Bromma, Sweden

[22] Filed: Mar. 12, 1973

[21] Appl. No.: 339,994

[30] Foreign Application Priority Data
Mar. 24, 1972   Sweden.............................. 3830/72

[52] U.S. Cl...................... 350/6, 350/285, 356/93, 356/179
[51] Int. Cl. ............................................ G02b 27/00
[58] Field of Search ............. 350/6, 7, 285; 356/84, 356/93, 95, 97, 211

[56] References Cited
UNITED STATES PATENTS
3,698,297   10/1972   Herden .............................. 350/6 X OTHER PUBLICATIONS
Rutter, IBM Technical Disclosure Bulletin, Vol. 5, No. 4, Sept. 1962, p. 57.

Primary Examiner—Ronald L. Wibert
Assistant Examiner—Matthew W. Koren

[57] ABSTRACT

System for periodicially shifting a light beam between two axially displaced paths consists of a rotary assembly subdivided into at least three angularly displaced segments, one of the segments allowing the beam to pass through the assembly along one path, the other two segments comprising axially aligned radially spaced oppositely directed conically shaped reflectors arranged to axially displace the beam when it impinges on one of them.

9 Claims, 3 Drawing Figures

PATENTED OCT 22 1974　　　　　　　　　　　　　3,843,226

APPARATUS FOR PERIODICAL PARALLEL DISPLACEMENT OF AT LEAST ONE PARALLEL BEAM

The present invention refers to an apparatus for periodical parallel displacement of at least one parallel beam, the apparatus to be used e.g., in optical monitors or analysers.

Optical analysis of fluid samples is often performed by measuring the transmission of light of one or several wave-lengths through the sample in order to determine the light-absorption in the sample. In many applications these determinations are made on a gas or liquid flow. It is then often a need for simultaneous analysis of the absorption properties with respect to more than one wave-length and to make measurements on at least two different flows, e.g., a sample flow and a reference flow. A number of simultaneous measurements using different wave-lengths and flows could of course be performed by using a corresponding number of light sources and detectors. Such systems will, however, be very expensive and errors will appear when the results from the different measurements are compared, since the errors that appear in the different measurements are independent of each other. It is thus desireable to use as much of the apparatus as possible in common for the different measurements. This could be performed by carrying out a periodical sampling at a frequency high enough to monitor the dynamic process. In order to use a common detector for all the measurements, one will thereby require an optical system by means of which light having different wave-lengths periodically could be made to inpinge towards different cells, the contents of which are to be analysed. However, devices which could make this in a reliable and unexpensive way without a too big loss of intensity are at present not commercially available. It is an object of the present invention to provide an apparatus by means of which at least one parallel beam could be brought to inpinge periodically towards at least two different measurement cells in an optical analyser in such a way that the same detector could be used for both cells. The characteristics of the invention will appear from the claims attached to the specification.

Figure 2:
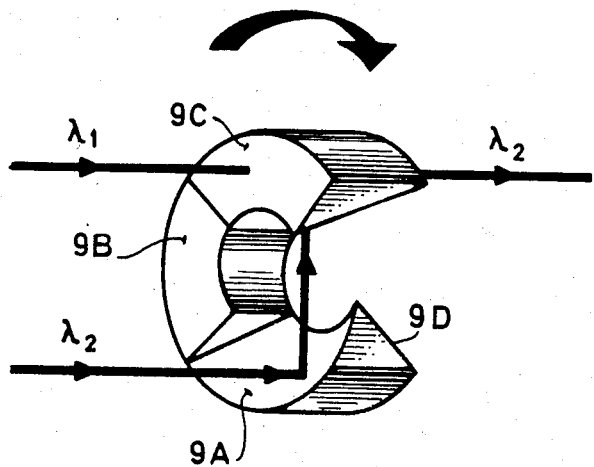
Figure 3:
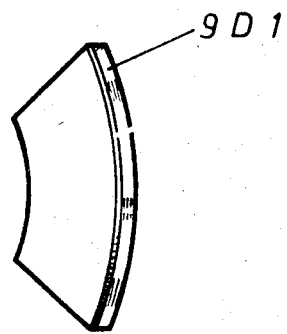

The invention will now be described in detail, reference being made to the enclosed drawing in which:

FIG. 1 schematically shows an apparatus where two different measurement cells periodically transmit light of two different wave-lengths by means of an apparatus according to the invention FIG. 2 is a perspective view of an apparatus according to the invention, and FIG. 3 is a perspective view of a filter which may be placed in the open sector of FIG. 2.

In FIG. 1 references 1 and 2 denote two different light sources, e.g. consisting of gas filled ampoules which are excited by means of high frequency electrical signals applied from electrodes (not shown) surrounding the ampoules. The light generated passes through two filters 3 and 4 which are presumed to transmit light of the wave-lengths $\lambda 1$ and $\lambda 2$, these wavelengths being part of the spectrum of the respective light sources. It would, of course, also be possible to use a common light source including both wavelengths. The filtered light then passes through two slits 11 and 12, respectively, and inpinges towards a device 9. The device 9 consists of a rotating cylinder having a coaxial bore, the detailed design of which is shown in FIG. 2. As appears from FIG. 2 the inner wall of the bore is divided into four approximately equal sectors 9 A–D of which the sector 9 A is provided with a conical reflecting surface having a radius decreasing rightwards in the figure, whereas the sector 9 C, diametrically opposed to the sector 9 A, is provided with a corresponding conical reflecting surface having a radius increasing rightwards. The sector 9 B is provided with a cylindrical body which does not transmit light from any of the actual light sources. The surface of the sector 9 C turned towards the light sources does also have this non-transmitting property. Through the fourth sector 9 D, finally, light can pass without any disturbing effects. The apparatus according to FIG. 1 further comprises two flow cells 5 and 6, one of which preferably is a reference cell. Light passing through the cells inpinges towards a schematically shown photo-detector 7, e.g., a photo-multiplier at the output 8 of which a signal corresponding to the absorption in the cells is obtained. In certain applications it is suitable to arrange an optical system between the cells and the detectors in order to make the two beams meet the detector at one common point. The cylinder 9 is by means of a motor not shown made to rotate around its axis preferably at constant velocity the position of the cylinder being indicated as an indication output 10.

If the cylinder 9 is rotated the following process will occur. When the cylinder is in a position as schematically shown in FIGS. 1 and 2, the beam from the lower lamp of the wave-length $\lambda 2$ will after a reflection in the reflecting sectors 9 A and 9 C inpinge towards the upper cell 5, the output signal of the photo-multiplier indicating the transmission of the sample in the cell 5 for the wave-length $\lambda 2$. Light having the wave-length $\lambda 1$ will meet the non-transmitting surface of the sector 9 C. If the cylinder is turned a quarter of a full turn in the direction of the arrow, the beam $\lambda 2$ will inpinge towards the sector 9 D and then pass through the cylinder 9 and meet the lower cell 6. Light of the wave-length $\lambda 1$ will, however, still not pass the bore due to the non-transmitting body within the sector 9 B. When the cylinder is turned another quarter of a turn, the beam $\lambda 2$ will meet non-transmitting surface of the sector 9 C, whereas the beam $\lambda 1$ will meet the reflecting sector 9 A and will thus reach the cell 6 via the reflecting surface 9 C. After still another turn light having the wave-length $\lambda 1$ will pass through the sector 9 D and inpinge towards the upper cell 5 whereas the beam $\lambda 2$ will meet the non-transmitting body within the sector 9 B. At the output 8 one will thus periodically obtain signals which correspond to the transmission within the cells 5 and 6 for the wave-lengths $\lambda 1$ and $\lambda 2$, respectively. These signals could either be directly transferred to our four channel plotter where four different plots are obtained or they could be subject to some suitable computing before they are supplied to a registering instrument. If e.g., the cell 5 is a reference cell and the cell 6 a sample cell signals derived from the cell 6 could be compared with the corresponding result from cell 5 before they are registered. In order to do this computing it is, of course, necessary that one is sure of what measurement from which the signals are derived. The cylinder 9 is, therefore, suitably provided with optical marks for the four different sectors, said marks being detected during the rotation of the cylinder so as to obtain signals at an output 10 corresponding to the position of the cylinder. The different calculations of the signals from the outputs 8 and 10 could be made by electronic circuitry known per se and will not be described in detail. In order to obtain comparable results from beams that pass the cylinder 9 after two reflections and beams that pass straight through the sector 9 D one could suitably introduce an absorbing filter 9 D, as shown in FIG. 3 in the sector 9 D, the absorption of this filter corresponding to the absorption obtained by reflection.

I claim:

1. System for periodically shifting a beam of light from a single source between two axially spaced paths, comprising an assembly rotatable about an axis generally parallel with the path of light from said source and subdivided into at least three angularly displaced segments, one of said segments permitting said beam to pass through said assembly along a first path, the other two segments comprising respectively axially aligned radially spaced oppositely directed conically shaped reflectors arranged to transmit said beam impinging on one of said reflectors through said rotatable assembly and along a second path axially displaced with respect to said first path.

2. The invention defined in claim 1, wherein said one segment comprises absorption filter means.

3. The invention defined in claim 1, wherein said rotatable assembly is subdivided into at least four angularly displaced segments, the fourth of said segments preventing passage of said beam through said assembly.

4. The invention defined in claim 3, wherein said one segment comprises absorption filter means.

5. The invention defined in claim 3, wherein each of said segments is equiangular.

6. The invention defined in claim 3, wherein said first and second paths of light are parallel to each other.

7. The invention defined in claim 3, wherein said system includes means to transmit first and second axially displaced beams of light to impinge, respectively on angularly displaced segments of said rotatable assembly simultaneously, said beams being alternatively and selectively transmitted through said rotatable assembly along respective ones of said first and second paths.

8. The invention defined in claim 7, wherein each of said segments extends over approximately 90° of arc.

9. The invention defined in claim 7, wherein said segment permitting said beam to pass through said assembly includes absorption filter means.

* * * * *